United States Patent [19]
Bursik et al.

[11] 3,795,782
[45] Mar. 5, 1974

[54] SUPPORTING WELDING PLATE FOR A BINDING MACHINE FOR BINDING TOGETHER A PLURALITY OF OBJECTS WITH A STEEL TAPE

[75] Inventors: Ladislav Bursik; Jan Bursik; Jan Lany, all of Ostrava, Czechoslovakia

[73] Assignee: Vitkovicke Zelezarny Klementa Gottwalda, Narodni podnik, Ostrava, Czechoslovakia

[22] Filed: Oct. 18, 1972

[21] Appl. No.: 298,509

[30] Foreign Application Priority Data
Oct. 20, 1971  Czechoslovakia ................. 7338-71

[52] U.S. Cl. .................... 219/86, 100/29, 219/89, 219/161
[51] Int. Cl. ............................................ B23k 11/10

[58] Field of Search... 219/86, 87, 89, 56, 158, 160, 219/161; 100/29, 33

[56]  References Cited
UNITED STATES PATENTS
3,439,606  4/1969  Bursik et al. ..................... 219/89 X
1,486,897  3/1924  Huguerin ......................... 219/86 X

*Primary Examiner*—Bruce A. Reynolds
*Attorney, Agent, or Firm*—Arthur O. Klein

[57] ABSTRACT

A supporting welding plate for the spot welding of a steel tape binding together a plurality of longitudinal objects, the plate supported on a pivotable lever, thus enabling its lateral removal after finished welding and thus enabling a free manipulation with the formed packet of bound objects without any danger of damaging the formed hoop or the welding plate.

4 Claims, 2 Drawing Figures

SUPPORTING WELDING PLATE FOR A BINDING MACHINE FOR BINDING TOGETHER A PLURALITY OF OBJECTS WITH A STEEL TAPE

BACKGROUND OF THE INVENTION

The invention relates to a supporting welding plate for a machine for binding objects together by placing a steel tape around said objects to form a packet and thereafter spot-welding both ends of the tape.

Known machines performing this described operation generally include means for guiding the steel tape around these objects and for tightening this tape prior to connecting both ends of the tape by spot-welding. The steel tape is guided in a plane perpendicular to the feeding axis of the packet in a groove of these guide means encompassing the bound objects. The ends of the tightened steel tape, in at all known arrangements, are spot-welded by electrodes, one or two of which are mobile and approached from below, whereas the counterelectrode is a stationary supporting welding plate having the shape of a bracket, situated in the course of welding between the steel tape and the packeted objects. A release of the packet is accomplished by its shifting in the feeding direction, perpendicularly to the welding plate.

This kind of welding plate has a drawback in that the shifting of the hoop with respect to the welding plate can be accomplished solely in one direction, that is, in the feeding direction. Even a small movement in the opposite direction or upwards can lead to the rupture of the steel band of the hoop or to a deformation of the welding plate. The feeding of the packet into the binding machine can therefore proceed in one direction only.

Another drawback is that in case of binding of circular configurations of objects such as coils of wires or of bands wherein simultaneously operating oppositely situated binding machines are used, one of these machines has to be left handed, the other right handed, this complicates the manufacture of binding machines and makes them more expensive.

SUMMARY OF THE INVENTION

It is an object of this invention to provide a supporting welding plate for a machine for binding objects together with steel tape which would allow feeding and removal of the bound objects in any suitable direction without the danger of tearing the steel tape or damaging the supporting welding plate. The supporting welding plate according to this invention is fixed to a holder connected to one end of a lever, the other end of this lever being joint supported on a bolt fixed to the machine frame, the longitudinal axis of this bolt being parallel with the upper surface of the welding plate and furthermore parallel with a plane passing through the groove of the guide means of the steel tape, the said lever being jointed to a piston rod of a power cylinder, which itself is joint supported on the machine frame.

The advantage offered by the welding plate according to this invention consists in that it enables a free movement of the bound packet in any direction immediately after the last welding spot of the hoop has been finished so that there is no danger of damaging both the hoop and the welding plate as would otherwise be the case where the welding plate is stable and enables solely a shifting of the packet with the hoop in a single direction only.

Binding machines with a pivotably supported welding plate can be therefore used where the bound profiles or objects are supplied to the machine from both sides of the guide means of the steel tape. If guide means are used which can be opened at the top, the bound objects can be supplied from the top and after being bound, again lifted without a prior shifting in the horizontal direction in order to be loosened from the welding plate.

When binding circular configurations of objects using two hoops, binding machines of the same design can be used if both hoops are accomplished by mutually opposed binding machines.

DESCRIPTION OF DRAWINGS

The welding plate according to this invention is shown in an examplary embodiment in the attached drawing, where.

DESCRIPTION OF PREFERRED EMBODIMENT

Figure 1:
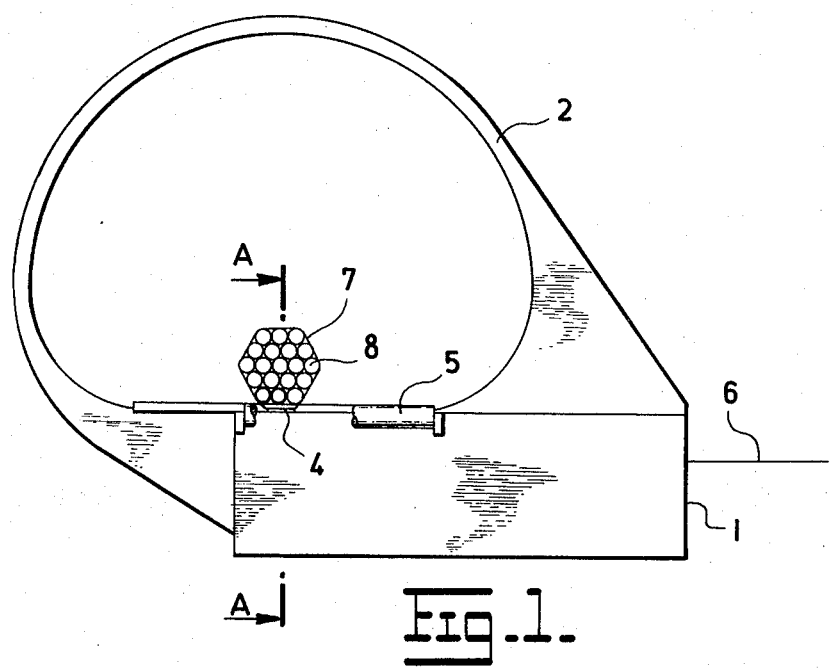
FIG. 1 is an elevation of a part of the binding machine with a packet of tubes and FIG. 2 a longitudinal cross section in enlarged scale along a plane indicated in FIG. 1 by A—A, leading through the packet and the binding machine and showing the fastening of the welding plate to its pivotable support.
Figure 2:
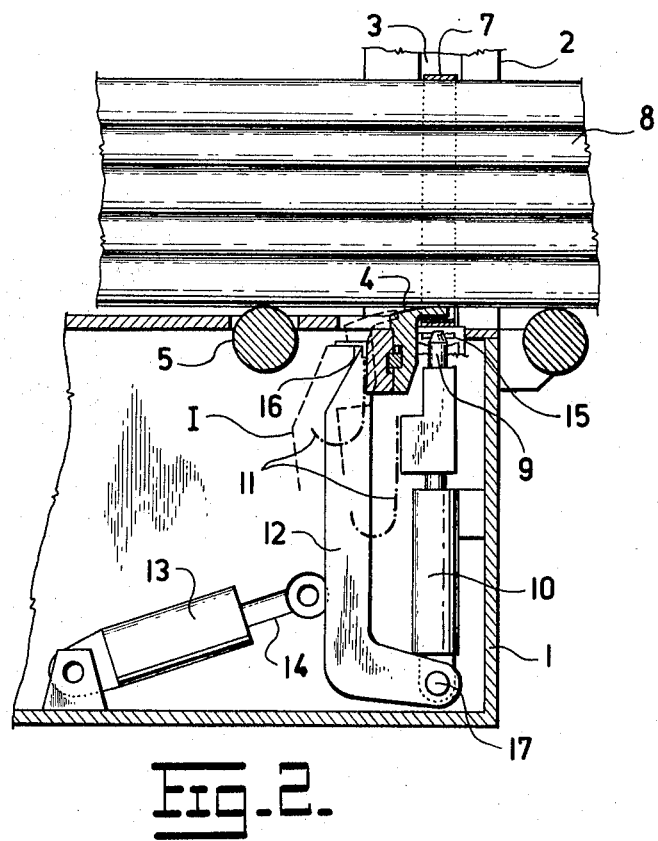

The drawing shows a frame 1 with guide means 2 with a groove 3 for guiding the steel tape 6. Power cylinder 10 controlling auxiliary electrodes 9 connected to flexible feeders 11 of electric power are fastened to this frame 1. The second flexible feeder 11 of electric power is connected to the supporting welding plate 4, detachably fixed to a bracket on one end of a lever 12, the other end of which lever 12 is pivotably supported on a bolt 17. The longitudinal axis of this bolt 17 is parallel with the upper surface of the welding plate 4, which is in the level of the feed rollers 5 of a conveyor and parallel with a plane passing through the groove 3 of the guide means 2. A piston rod 14 of a second power cylinder 13, pivotably fixed to the frame 1 is joint connected to the lever 12. At the place where the welding plate is fixed to its support, a channel is provided, connected to a supply of cooling water and a protective sheet 16, protecting the internal space of the frame 1 from dirt, is fixed to this support.

OPERATION

The profiles to be bound are supplied longitudunally, for instance, on feed rollers 5 to the binding machine and are formed by not shown forming means to a packet of suitable shape. The steel tape 6, supplied from the outside into the binding machine by friction feeding rollers in the frame 1 is guided under the welding plate 4 through the groove 3 of the guide means 2 around the packet, whereafter the end of the steel tape 6 is fixed by pressure from below towards the welding plate 4. The steel tape 6 is thereafter tightened around the packet by return movement of the friction feeding rollers and after the adjustable stress is obtained, the overlapping ends of the steel tape 6 are subsequently spot-welded by the mobile electrodes 9 controlled by power cylinders 10. Thus a bound packet 8 is obtained and its hoop 7 is after the finished first welding spot cut by cutters 15 from the steel tape 6, whereafter the following welding spot is accomplished.

The hoop 7 presses the packet 8 towards the upper surface of the welding plate 4. The hoop 7 and thus also the packet 8 is automatically released from the welding plate after the last welding spot is finished by swinging back the lever 12 into a position 1 indicated by broken lines by the action of the second power cylinder 13 which is pivotably supported on the frame 1 by means of its piston rod 14 joint connected to the lever 12, which is adapted to swing within a plane passing through the groove 3 of the guide means 2. The packet 8 can be thereafter removed to its place of destination.

We claim:

1. In a binding machine for binding together a plurality of objects with a loop of a metal tape connected by spot welding to form a bundle, said binding machine including a machine frame having object supporting means thereon, guide means operatively mounted in said frame for guiding a metal tape in a loop around said plurality of objects on the supporting means on the frame, and means for spot welding together overlapping portions of the tape loop, the improvement which comprises: a welding support plate on the frame selectively movable from an operative position in which it lies within a loop of tape and underlies and forms a support for the objects to an inoperative position laterally removed from the loop, said welding support plate in operative position overlying overlapped portions of the tape and forming as a first electrode, a second electrode selectively movable from an operative position in which the overlapping portions of the tape are gripped between it and the welding support plate to an inoperative position spaced from the tape, a second said welding support plate electrode mounted on one end of a pivotable lever, a pivot pin on the frame supporting the other end of said lever, the longitudinal axis of said pivot pin being parallel with the plane of the loop passed around the bound objects, and means for selectively swinging said lever to move the support plate into operative and inoperative positions.

2. A binding machine as in claim 1, wherein said means for selectively swinging said lever to move the support plate into operative and inoperative positions comprises a power cylinder having a piston rod, the power cylinder being pivotally supported on the machine frame, and the outer free end of the piston rod being pivotally connected to the lever.

3. A binding machine as in claim 1, wherein the second electrode is moved toward and away from the support plate in a direction normal to the broad extent of such plate, and comprising power means for moving the second electrode.

4. A binding machine as in claim 3, wherein the means for moving a second electrode includes a second power cylinder, the second cylinder having a second piston rod, the longitudinal axis of the second power cylinder and the second piston rod lying in the plane of the longitudinal axis of said pivot pin which pivotally supports the first power cylinder on the frame.

* * * * *